US012641147B2

(12) United States Patent
Mukherjee

(10) Patent No.: US 12,641,147 B2
(45) Date of Patent: May 26, 2026

(54) SYSTEM AND METHOD FOR WIRELESS ONLINE PROCESSING USING A PEER TO PEER NETWORK

(71) Applicant: BANK OF AMERICA CORPORATION, Charlotte, NC (US)

(72) Inventor: Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 37 days.

(21) Appl. No.: 18/740,206

(22) Filed: Jun. 11, 2024

(65) Prior Publication Data

US 2025/0379906 A1     Dec. 11, 2025

(51) Int. Cl.
H04L 67/104     (2022.01)
H04W 28/02     (2009.01)

(52) U.S. Cl.
CPC ...... H04L 67/1046 (2013.01); H04L 67/1053 (2013.01); H04W 28/0236 (2013.01)

(58) Field of Classification Search
None
See application file for complete search history.

(56) References Cited

U.S. PATENT DOCUMENTS

| | | | |
|---|---|---|---|
| 8,582,591 B2 | 11/2013 | Macinnis et al. | |
| 9,037,147 B2 | 5/2015 | Tabrizi et al. | |
| 9,198,096 B2 | 11/2015 | Quigley et al. | |
| 9,444,784 B2 | 9/2016 | Burns et al. | |
| 9,451,650 B2 | 9/2016 | Dunne et al. | |
| 9,820,333 B1 | 11/2017 | Kopikare et al. | |
| 9,974,040 B1 | 5/2018 | Chu et al. | |
| 10,460,263 B1 | 10/2019 | Martin et al. | |
| 10,594,785 B2 | 3/2020 | Rajamani et al. | |
| 11,497,067 B2 | 11/2022 | Shanks et al. | |
| 11,665,610 B2 | 5/2023 | Yeddala et al. | |
| 11,792,889 B2 | 10/2023 | Damm et al. | |
| 11,871,222 B1 | 1/2024 | Feng et al. | |
| 12,160,468 B2 | 12/2024 | Rice et al. | |
| 2011/0113094 A1* | 5/2011 | Chunilal | H04L 67/02 709/204 |
| 2016/0302239 A1* | 10/2016 | Sheng | H04W 76/10 |
| 2018/0342329 A1* | 11/2018 | Rufo | G16H 40/67 |
| 2024/0171456 A1* | 5/2024 | Singla | H04W 12/06 |
| 2024/0311816 A1* | 9/2024 | Singh | H04L 9/3239 |
| 2025/0274203 A1* | 8/2025 | Bhupatiraju | H04B 17/318 |

* cited by examiner

*Primary Examiner* — Fadi Haj Said
(74) *Attorney, Agent, or Firm* — Moore & Van Allen PLLC; Nicholas C. Russell

(57)     ABSTRACT

A system is provided for wireless online processing using a peer to peer network. In particular, the system may comprise a plurality of wireless computing devices in nearby proximity to one another that may form the peer to peer ("P2P") network through a shared wireless communication channel. The system may identify the network connection strengths of each of the plurality of wireless computing devices and subsequently designate one or more devices as the hubs of the P2P network. Each of the wireless computing devices may have one or more online processes to be completed through the network connections formed by the P2P network. The processes may be propagated to the devices within the P2P network, where the data used to complete the processes may be encrypted within the memory or storage devices of each of the computing devices.

20 Claims, 4 Drawing Sheets

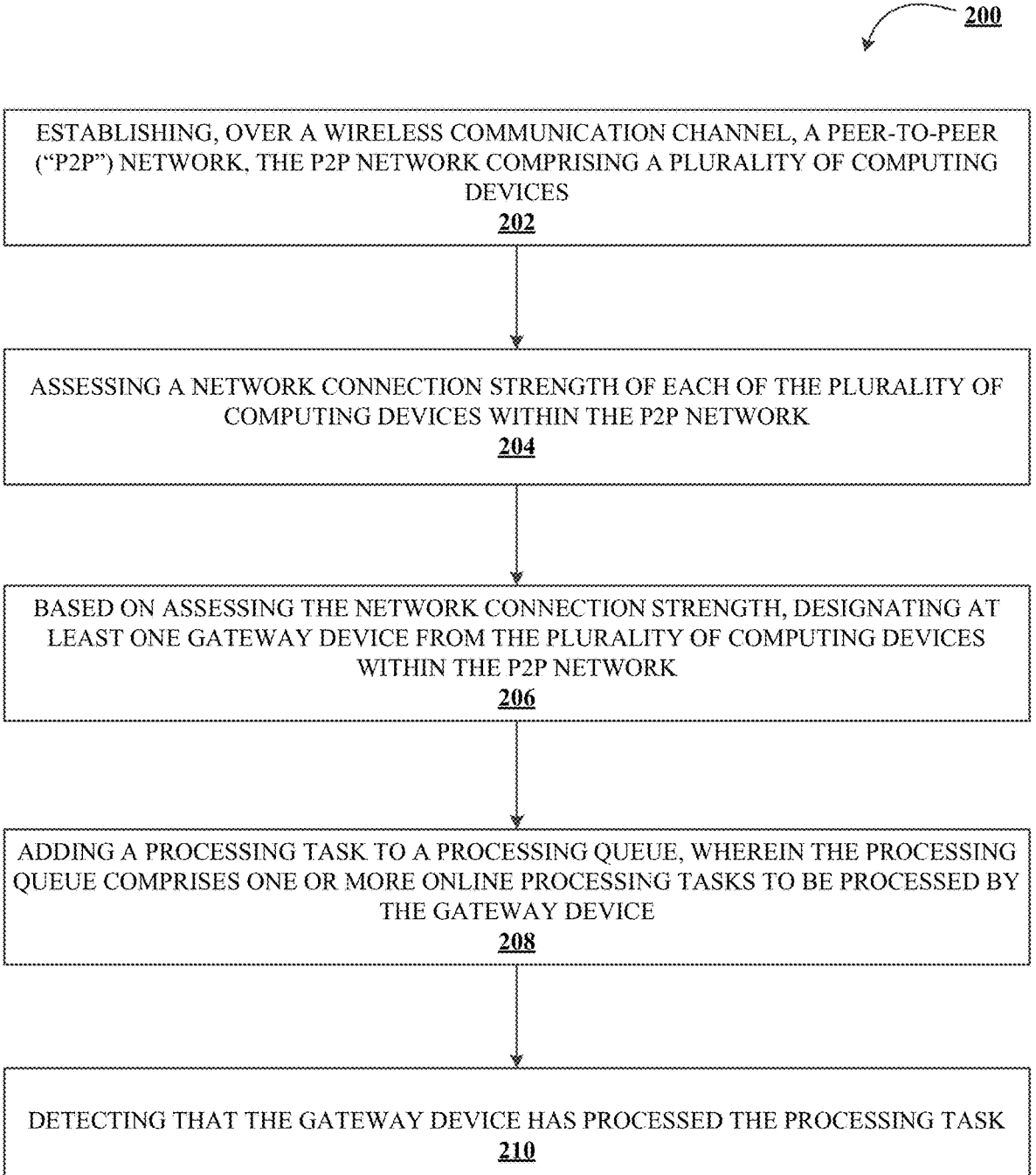

200

ESTABLISHING, OVER A WIRELESS COMMUNICATION CHANNEL, A PEER-TO-PEER ("P2P") NETWORK, THE P2P NETWORK COMPRISING A PLURALITY OF COMPUTING DEVICES
202

ASSESSING A NETWORK CONNECTION STRENGTH OF EACH OF THE PLURALITY OF COMPUTING DEVICES WITHIN THE P2P NETWORK
204

BASED ON ASSESSING THE NETWORK CONNECTION STRENGTH, DESIGNATING AT LEAST ONE GATEWAY DEVICE FROM THE PLURALITY OF COMPUTING DEVICES WITHIN THE P2P NETWORK
206

ADDING A PROCESSING TASK TO A PROCESSING QUEUE, WHEREIN THE PROCESSING QUEUE COMPRISES ONE OR MORE ONLINE PROCESSING TASKS TO BE PROCESSED BY THE GATEWAY DEVICE
208

DETECTING THAT THE GATEWAY DEVICE HAS PROCESSED THE PROCESSING TASK
210

FIG. 2

SYSTEM AND METHOD FOR WIRELESS ONLINE PROCESSING USING A PEER TO PEER NETWORK

TECHNOLOGICAL FIELD

Example embodiments of the present disclosure relate to a system for wireless online processing using a peer to peer network.

BACKGROUND

There is a need for an intelligent, efficient way to execute and complete online processes in instances of unreliable network connectivity.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for wireless online processing using a peer to peer network. In particular, the system may comprise a plurality of wireless computing devices in nearby proximity to one another that may form the peer to peer ("P2P") network through a shared wireless communication channel. The system may identify the network connection strengths of each of the plurality of wireless computing devices and subsequently designate one or more devices as the hubs of the P2P network. Once the hubs have been designated, each of the wireless computing devices may have one or more online processes to be completed through the network connections formed by the P2P network. The processes may be propagated to the devices within the P2P network, where the data used to complete the processes may be encrypted within the memory or storage devices of each of the computing devices, thereby rendering such data inaccessible by the users of such devices. In this way, the system may provide a secure and effective way to complete online processes even when network connections in a particular location may be unreliable or have limited availability.

Accordingly, embodiments of the present disclosure provide a system for wireless online processing using a peer to peer network, the system comprising: a processing device; a non-transitory storage device containing instructions when executed by the processing device, causes the processing device to perform the steps of: establishing, over a wireless communication channel, a peer-to-peer ("P2P") network, the P2P network comprising a plurality of computing devices; assessing a network connection strength of each of the plurality of computing devices within the P2P network; based on assessing the network connection strength, designating a gateway device from the plurality of computing devices within the P2P network; adding a processing task to a processing queue, wherein the processing queue comprises one or more online processing tasks to be processed by the gateway device; and detecting that the gateway device has processed the processing task.

In some embodiments, establishing the P2P network comprises: detecting that a peer computing device is within a threshold distance; and transmitting a request to the peer computing device to establish the P2P network.

In some embodiments, communications over the wireless communication channel are transmitted and received based on at least one of a Wi-Fi connection, a Bluetooth connection, or an NFC connection.

In some embodiments, assessing the network connection strength of each of the plurality of computing devices comprises assessing wireless signal strength, networking bandwidth, latency, wireless connection stability, Internet connection stability, and network transfer speeds of each of the plurality of computing devices.

In some embodiments, assessing the network connection strength further comprises generating a ranked list of the plurality of computing devices within the P2P network ordered by network connection strength.

In some embodiments, designating the gateway device further comprises: detecting that the gateway device is unavailable; reassessing the network connection strength of each of the plurality of computing devices; and based on reassessing the network connection strength of each of the plurality of computing devices, designating a replacement gateway device to process the one or more online processing tasks in the processing queue.

In some embodiments, the processing queue further comprises data and metadata required to process each of the one or more one processing tasks.

Embodiments of the present disclosure also provide a computer program product for wireless online processing using a peer to peer network, the computer program product comprising a non-transitory computer-readable medium comprising code causing an apparatus to perform the steps of: establishing, over a wireless communication channel, a peer-to-peer ("P2P") network, the P2P network comprising a plurality of computing devices; assessing a network connection strength of each of the plurality of computing devices within the P2P network; based on assessing the network connection strength, designating a gateway device from the plurality of computing devices within the P2P network; adding a processing task to a processing queue, wherein the processing queue comprises one or more online processing tasks to be processed by the gateway device; and detecting that the gateway device has processed the processing task.

In some embodiments, establishing the P2P network comprises: detecting that a peer computing device is within a threshold distance; and transmitting a request to the peer computing device to establish the P2P network.

In some embodiments, communications over the wireless communication channel are transmitted and received based on at least one of a Wi-Fi connection, a Bluetooth connection, or an NFC connection.

In some embodiments, assessing the network connection strength of each of the plurality of computing devices comprises assessing wireless signal strength, networking bandwidth, latency, wireless connection stability, Internet connection stability, and network transfer speeds of each of the plurality of computing devices.

In some embodiments, assessing the network connection strength further comprises generating a ranked list of the plurality of computing devices within the P2P network ordered by network connection strength.

In some embodiments, designating the gateway device further comprises: detecting that the gateway device is unavailable; reassessing the network connection strength of each of the plurality of computing devices; and based on reassessing the network connection strength of each of the plurality of computing devices, designating a replacement gateway device to process the one or more online processing tasks in the processing queue.

Embodiments of the present disclosure also provide a computer-implemented method for wireless online processing using a peer to peer network, the computer-implemented method comprising: establishing, over a wireless communication channel, a peer-to-peer ("P2P") network, the P2P network comprising a plurality of computing devices; assessing a network connection strength of each of the plurality of computing devices within the P2P network; based on assessing the network connection strength, designating a gateway device from the plurality of computing devices within the P2P network; adding a processing task to a processing queue, wherein the processing queue comprises one or more online processing tasks to be processed by the gateway device; and detecting that the gateway device has processed the processing task.

In some embodiments, establishing the P2P network comprises: detecting that a peer computing device is within a threshold distance; and transmitting a request to the peer computing device to establish the P2P network.

In some embodiments, communications over the wireless communication channel are transmitted and received based on at least one of a Wi-Fi connection, a Bluetooth connection, or an NFC connection.

In some embodiments, assessing the network connection strength of each of the plurality of computing devices comprises assessing wireless signal strength, networking bandwidth, latency, wireless connection stability, Internet connection stability, and network transfer speeds of each of the plurality of computing devices.

In some embodiments, assessing the network connection strength further comprises generating a ranked list of the plurality of computing devices within the P2P network ordered by network connection strength.

In some embodiments, designating the gateway device further comprises: detecting that the gateway device is unavailable; reassessing the network connection strength of each of the plurality of computing devices; and based on reassessing the network connection strength of each of the plurality of computing devices, designating a replacement gateway device to process the one or more online processing tasks in the processing queue.

In some embodiments, the processing queue further comprises data and metadata required to process each of the one or more one processing tasks.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
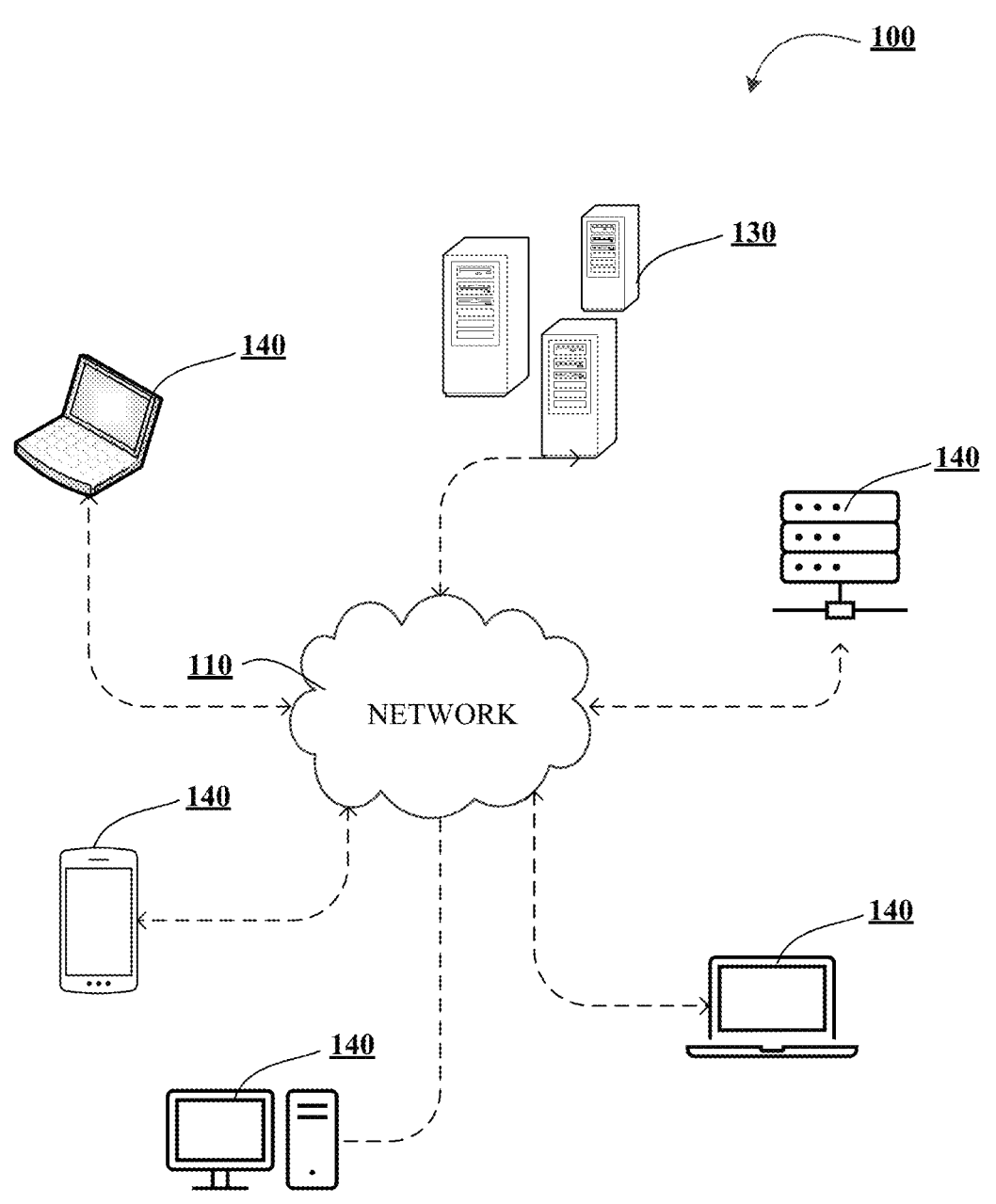
Figure 1B:
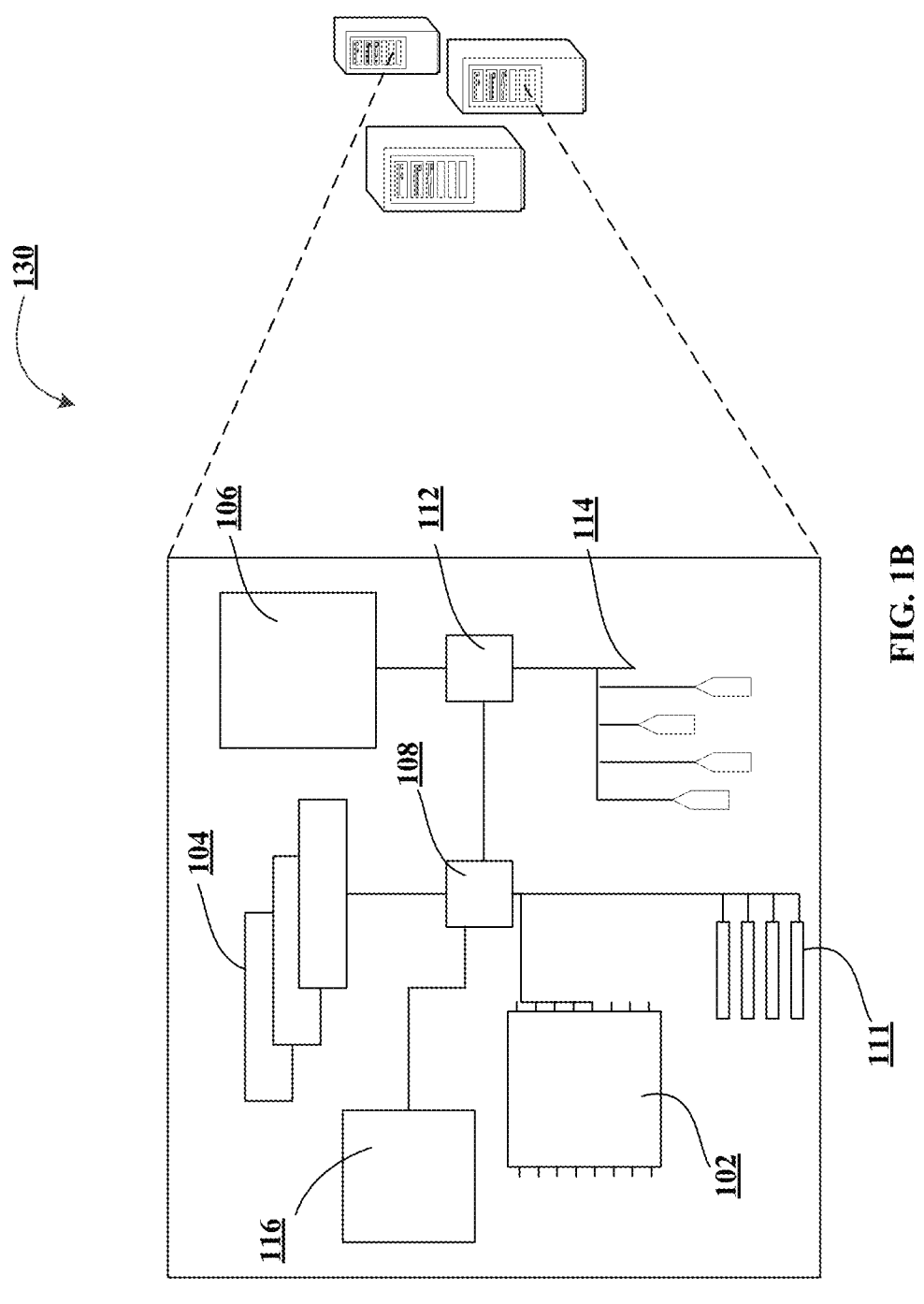
Figure 1C:
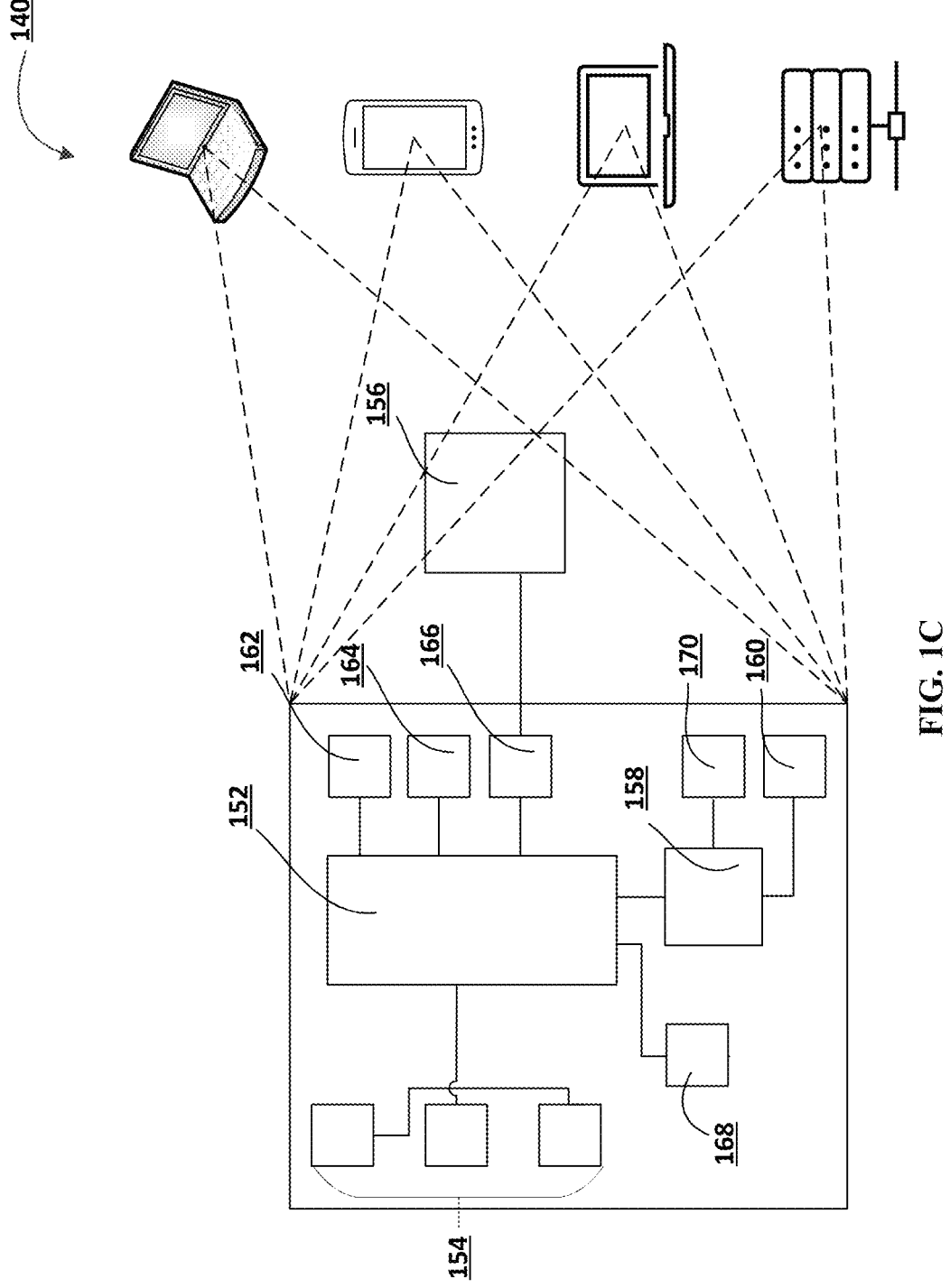

FIGS. 1A-1C illustrates technical components of an exemplary distributed computing system for wireless online processing using a peer to peer network, in accordance with an embodiment of the disclosure; and FIG. 2 illustrates a method for wireless online processing using a peer to peer network, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique character-istic information (e.g., iris recognition, retina scans, finger-prints, finger veins, palm veins, palm prints, digital bone anatomy/structure and positioning (distal phalanges, inter-mediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication infor-mation or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more direc-tions or may be rotated about an axis (i.e., rotationally coupled, pivotally coupled). Furthermore, "operatively coupled" may mean that components may be electronically connected and/or in fluid communication with one another.

As used herein, an "interaction" may refer to any com-munication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illus-tration." Any implementation described herein as "exem-plary" is not necessarily to be construed as advantageous over other implementations.

As used herein, "determining" may encompass a variety of actions. For example, "determining" may include calcu-lating, computing, processing, deriving, investigating, ascer-taining, and/or the like. Furthermore, "determining" may also include receiving (e.g., receiving information), access-ing (e.g., accessing data in a memory), and/or the like. Also, "determining" may include resolving, selecting, choosing, calculating, establishing, and/or the like. Determining may also include ascertaining that a parameter matches a prede-termined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digi-tal currencies, and/or the like.

Wireless computing devices such as smartphones, wear-able smart devices, and laptops may use a wireless network connection (e.g., a cellular network based Internet connec-tion) to complete various online tasks. That said, with respect to any particular wireless computing devices, there may be instances or scenarios in which the wireless network connection may be interrupted, unavailable, limited, or intermittent in its connectivity. For example, the wireless computing device may be located in a building with thick walls or other elements that may interfere with the wireless signals between the computing device and the routing struc-tures (e.g., cellular towers, networking routers, and/or the like), or the computing device may be in a geographic location that is out of the range of coverage of the service area of the cellular network. In such a scenario, any pro-cesses that require a network connection may be unable to be completed until a network connection becomes available once again. Accordingly, there is a need for a secure way to perform the online processes of a computing device even when the computing device itself may not have a stable network connection.

To address the above concerns among others, the system described herein provides a way to share and complete online processes using an encrypted peer to peer ("P2P") network. As an overview, the system may comprise a plurality of computing devices (e.g., wireless computing devices) located in near proximity to one another. In this regard, the plurality of computing devices may be located in the same general geographic area (e.g., within the same building) and/or within a defined radius from a point of reference (e.g., within 50 meters). Based on the character-istics of the computing devices (e.g., networking hardware, interference shielding or reduction, driver and/or operating system version, and/or the like), the environment of the computing devices (e.g., being located in an area with stronger cellular network reception, such as near an opening in a building wall, such as a window), and/or the nature of the network connection of the computing device (e.g., faster and/or more reliable cellular network service), certain com-puting devices may have a stronger, faster, and/or more consistent Internet connection than other devices within the same area.

Accordingly, each of the computing devices may com-prise a networking application that, when activated by the user (e.g., by the user opening the application on their device), creates or join an ad-hoc P2P network with the other devices within near proximity. If a P2P network does not currently exist, the computing device may create the ad-hoc P2P network by assigning a unique identifier to the P2P network. The unique identifier may be, for instance, an alphanumeric string such as a hash value computed using various seed values (e.g., an identifier of the computing device, time, geographic location, and/or the like). Subse-quently, when the networking application is opened on other devices (e.g., a second computing device), the application may query the nearby computing devices to verify whether a P2P network currently exist. Upon detecting the existence of the P2P network, the networking application of the second computing device may request to join the P2P network as a participant. In this manner, the various computing devices may communicate with one another using local wireless technology (e.g., Wi-Fi, NFC, Bluetooth, and/or the like).

Once the P2P network has been established, the computing devices may query one another to verify the strength of the network connection of each of the individual computing devices. The strength of the network connection may be determined by the computing devices based on a number of factors, such as the connection stability, wireless signal strength, available bandwidth, latency values, and/or the like. Upon determining the network connection strengths of each of the devices in the P2P network, the system may generate a ranked list of computing devices based on their connection strengths (e.g., with devices being ranked in descending order of network strength). Based on the ranked list, the system may select and designate one or more computing devices to be the "gateway" or "hub" devices through which network traffic will flow to conduct online processes within the P2P network. In some embodiments, the number of designated gateway devices may be selected based at least partially on the number of devices having a connection strength above a designated threshold (e.g., the number of devices that have a viable connection strength) and the total number of devices connected to the P2P network.

Upon designating the gateway devices, the various devices within the P2P network may transmit a request to process one or more online processes or tasks to the one or more gateway devices, either directly or through one or more intermediate devices depending on the relative distance between the transmitting device and the one or more gateway devices. The request may comprise the data and/or metadata needed to perform the online processes or tasks. In an exemplary embodiment, the online process or task may be a request to execute an online transaction. In such embodiments, the data or metadata needed to execute the online transaction may be included within the request (e.g., destination addresses, account numbers, resource amounts, transfer timeframes, and/or the like). In some embodiments, the data or metadata needed to perform the online processes or tasks may be encrypted and stored within an encrypted space of the storage devices of the various computing devices (including the gateway devices) such that the data or metadata may be accessed on a per-needed basis by the gateway devices but may not be accessed, viewed, or modified by the user of such gateway devices. In this way, the system ensures that any sensitive data needed to perform the online processes may be protected in spite of the processing being completed on another device (e.g., the gateway devices). If one of the gateway devices becomes decoupled from the P2P network or experiences network connectivity issues, the task assigned to such gateway device may be redirected or reassigned to another gateway device for completion. In some embodiments, the data used to process a particular task may be securely deleted from the encrypted space once the particular task is completed through one of the gateway devices.

The gateway devices may add incoming online processing requests to a processing queue and subsequently process the requests in order. In this regard, each of the requests may contain the steps of the online process to be completed by the gateway device along with the data and/or metadata needed to perform the steps of the process. In embodiments in which multiple gateway devices are part of the P2P network, the gateway devices may share the processing queue and process the requests in turn in a distributed manner. For example, two gateway devices may each process every other request in a round robin manner. In other embodiments, the requests may be distributed in a weighted manner based on the capabilities of each of the gateway devices. For instance, a gateway device with higher processing power, memory space, networking bandwidth, and/or the like may be proportionally assigned a greater number of requests to be processed.

In some embodiments, the data regarding the processing queue (e.g., the process requests and queue number/time-stamps for each process request) may be replicated across at least a portion of the devices in the P2P network, or in some embodiments, across all of the devices of the P2P network. Once each process is completed within the queue, the queue may be updated on all of the devices in order to avoid duplicate requests from being processed. In some embodiments, the updates to the processing queue may be propagated in a pull configuration (e.g., from the gateway device that processes the transaction). In such an embodiment, the other devices in the P2P network may perform a hash based verification of the encrypted spaces of the other devices against the encrypted space of the gateway device. For instance, a querying device may hash its own encrypted space and also generate a hash of the encrypted space of the gateway device. If the hashes match, the querying device may determine that no update of the processing queue is necessary. However, if the hashes do not match, the querying device may determine that an update is necessary and subsequently pull the updated data from the gateway device. In other embodiments, the system may update the processing queue based on a push configuration, in which the gateway device, upon completing a processing task in the processing queue, pushes the updated data to the other devices within the P2P network. If a device exits or disconnects from the P2P network, the encrypted space within such device may be securely wiped. In this way, the system may provide a secure way to complete online processes using the P2P network.

An exemplary embodiment is provided as follows for illustrative purposes and should not be construed as restricting or limiting the scope of the disclosure provided herein. In one embodiment, a user may attempt to initiate an online transaction from the user's smartphone from the interior of a building. The user's smartphone may attempt to execute the transaction but fail to process the transaction due to poor network connectivity (e.g., the building may have thick walls or other structures that may interfere with the smartphone's cellular Internet connection). Upon failing to process the transaction, the user's smartphone may transmit wireless queries (e.g., through wireless communication channels such as Wi-Fi, NFC, Bluetooth, and/or the like) to verify whether a P2P network currently exists. If one does not exist and the smartphone identifies at least one other eligible device, the user's smartphone may transmit a request to the eligible device to create the P2P network. On the other hand, if the P2P network already exists, the smartphone may transmit a request to the other devices to join the P2P network.

Upon joining or creating the network, the smartphone may receive information regarding the processing queue, which may contain a list of the currently pending requests and/or the data needed to process such requests. The P2P network may have identified one or more gateway devices that may have the strongest network connections (e.g., devices with a strong and stable cellular signal). The smartphone may then add its transaction to the queue to be processed by an available gateway. Once the transaction has been processed, the smartphone may display a notification to the user that the transaction has been completed using the P2P network.

The system as described herein provides a number of technological benefits over conventional methods for task processing. For instance, by using a P2P network with prioritized gateway devices, the system may provide an effective way to complete online processes even in the absence of a stable network connection. Furthermore, by encrypting the designated spaces within the devices of the P2P network, the system may ensure the privacy and security of the processes to be processed on third party devices within the P2P network.

Turning now to the figures, FIGS. 1A-1C illustrate technical components of an exemplary distributed computing environment 100 for the system for wireless online processing using a peer to peer network. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multiprocessor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a method 200 for wireless online processing using a peer to peer network. As shown in block 202, the method includes establishing, over a wireless communication channel, a peer-to-peer ("P2P") network, the P2P network comprising a plurality of computing devices. The P2P network may be created, for instance, on an ad-hoc basis by at least two computing devices in close proximity to one another (e.g., within a defined radius or geographic area). In such embodiments, establishing the P2P network may comprise detecting that a peer computing device is within a threshold distance and transmitting a request to the peer computing device to establish the P2P network. Once the P2P network has been created, other computing devices may join and/or exit the P2P network over time. The computing devices within the P2P network may communicate through various wireless communication methods, such as Wi-Fi, Bluetooth, NFC, and/or the like.

Next, as shown in block 204, the method assessing a network connection strength of each of the plurality of computing devices within the P2P network. The network connection strength of a computing device may be computed based on various factors, such as wireless signal strength, networking bandwidth, latency, wireless connection stability, Internet connection stability, network transfer speeds, and/or the like. In some embodiments, assessing the network connection strength of each of the devices may further comprise generating a ranked list of computing devices within the P2P network ordered by network connection strength.

Next, as shown in block 206, the method includes based on assessing the network connection strength, designating at least one gateway device from the plurality of computing devices within the P2P network. In this regard, the gateway devices may be selected based on which devices have the highest network connection strength. Accordingly, in embodiments, in which multiple gateway devices are selected (e.g., the system designates a second gateway device, and/or a third gateway device, and/or a fourth gateway device, and the like), such gateway devices may be selected in order of their network connection strengths. In some embodiments, the system may select gateway devices based on additional factors, such as processing power, memory space, current processing workload, and/or the like. In the event that a gateway device becomes unavailable, disconnects from the P2P network, or experiences an interruption in the network connection, the system may reassess the network connection strengths of the devices within the P2P network and designate one or more replacement gateway devices based on the reassessed network connection strengths.

Next, as shown in block 208, the method includes adding a processing task to a processing queue, wherein the processing queue comprises one or more online processing tasks to be processed by the gateway device. Adding a processing task to the processing queue may further comprise appending the data and/or metadata required to complete the processing task to the processing queue. The processing queue may be replicated across the various devices within the P2P such that the processing tasks may be completed by any of the devices on which the processing queue is replicated. Accordingly, if a gateway device experiences a disruption in network connection strength, a new gateway device may be designated and the processing tasks may continue to be completed. In the event that multiple gateway devices are designated, the processing tasks within the processing queue may be executed by the gateway devices in a distributed manner.

Next, as shown in block 210, the method includes detecting that the gateway device has processed the processing task. In some embodiments, detecting that the gateway device has processed the processing task may comprise receiving an indication from the gateway device that the processing task has been completed. In response, the system may update the processing queue by removing the processing task from the processing queue. In other embodiments, the system may query the gateway device for updates on the processing queue, and responsive to the query, receive an indication that the processing task has been completed. Subsequently, the system may update the processing queue by removing the processing task from the processing queue. In this way, the system provides a secure and efficient way to execute online processes even when certain computing devices have a weak or unreliable network connection.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for wireless online processing using a peer to peer network, the system comprising:
   a processing device;
   a non-transitory storage device containing instructions when executed by the processing device, causes the processing device to perform the steps of:
      activating a networking application on a first computing device;
      querying a plurality of computing devices to verify if a peer-to-peer ("P2P") network associated with the networking application exists;
      establishing, if a P2P network does not exist and over a wireless communication channel, a P2P network comprising the plurality of computing devices, wherein the plurality of computing devices comprises the first computing device, wherein each computing device of the plurality of computing devices comprises the network application;
      assessing a network connection strength of each of the plurality of computing devices within the P2P network;
      based on assessing the network connection strength, designating a gateway device from the plurality of computing devices within the P2P network;
      adding a processing task from the first computing device to a processing queue, wherein the processing queue comprises one or more online processing tasks to be processed by the gateway device;
      detecting that the gateway device has processed the processing task; and
      updating the processing queue on each computing device of the plurality of computing devices.

2. The system of claim 1, wherein establishing the P2P network comprises:

detecting that a peer computing device is within a threshold distance; and
   transmitting a request to the peer computing device to establish the P2P network.

3. The system of claim 1, wherein communications over the wireless communication channel are transmitted and received based on at least one of a Wi-Fi connection, a Bluetooth connection, or an NFC connection.

4. The system of claim 1, wherein assessing the network connection strength of each of the plurality of computing devices comprises assessing wireless signal strength, networking bandwidth, latency, wireless connection stability, Internet connection stability, and network transfer speeds of each of the plurality of computing devices.

5. The system of claim 1, wherein assessing the network connection strength further comprises generating a ranked list of the plurality of computing devices within the P2P network ordered by network connection strength.

6. The system of claim 1, wherein designating the gateway device further comprises:
   detecting that the gateway device is unavailable;
   reassessing the network connection strength of each of the plurality of computing devices; and
   based on reassessing the network connection strength of each of the plurality of computing devices, designating a replacement gateway device to process the one or more online processing tasks in the processing queue.

7. The system of claim 1, wherein the processing queue further comprises data and metadata required to process each of the one or more one processing tasks.

8. A computer program product for wireless online processing using a peer to peer network, the computer program product comprising a non-transitory computer-readable medium comprising code causing an apparatus to perform the steps of:
   activating a networking application on a first computing device:
      querying a plurality of computing devices to verify if a peer-to-peer ("P2P") network associated with the networking application exists;
      establishing, if a P2P network does not exist and over a wireless communication channel, a P2P network comprising the plurality of computing devices, wherein the plurality of computing devices comprises the first computing device, wherein each computing device of the plurality of computing devices comprises the network application;
      assessing a network connection strength of each of the plurality of computing devices within the P2P network;
      based on assessing the network connection strength, designating a gateway device from the plurality of computing devices within the P2P network;
      adding a processing task from the first computing device to a processing queue, wherein the processing queue comprises one or more online processing tasks to be processed by the gateway device;
      detecting that the gateway device has processed the processing task; and
      updating the processing queue on each computing device of the plurality of computing devices.

9. The computer program product of claim 8, wherein establishing the P2P network comprises:
   detecting that a peer computing device is within a threshold distance; and
   transmitting a request to the peer computing device to establish the P2P network.

10. The computer program product of claim 8, wherein communications over the wireless communication channel are transmitted and received based on at least one of a Wi-Fi connection, a Bluetooth connection, or an NFC connection.

11. The computer program product of claim 8, wherein assessing the network connection strength of each of the plurality of computing devices comprises assessing wireless signal strength, networking bandwidth, latency, wireless connection stability, Internet connection stability, and network transfer speeds of each of the plurality of computing devices.

12. The computer program product of claim 8, wherein assessing the network connection strength further comprises generating a ranked list of the plurality of computing devices within the P2P network ordered by network connection strength.

13. The computer program product of claim 8, wherein designating the gateway device further comprises:

detecting that the gateway device is unavailable;

reassessing the network connection strength of each of the plurality of computing devices; and based on reassessing the network connection strength of each of the plurality of computing devices, designating a replacement gateway device to process the one or more online processing tasks in the processing queue.

14. A computer-implemented method for wireless online processing using a peer to peer network, the computer-implemented method comprising:

activating a networking application on a first computing device;

querying a plurality of computing devices to verify if a peer-to-peer ("P2P") network associated with the networking application exists;

establishing, if a P2P network does not exist and over a wireless communication channel, a P2P network comprising the plurality of computing devices, wherein the plurality of computing devices comprises the first computing device, wherein each computing device of the plurality of computing devices comprises the network application;

assessing a network connection strength of each of the plurality of computing devices within the P2P network;

based on assessing the network connection strength, designating a gateway device from the plurality of computing devices within the P2P network;

adding a processing task from the first computing device to a processing queue, wherein the processing queue comprises one or more online processing tasks to be processed by the gateway device;

detecting that the gateway device has processed the processing task; and updating the processing queue on each computing device of the plurality of computing devices.

15. The computer-implemented method of claim 14, wherein establishing the P2P network comprises:

detecting that a peer computing device is within a threshold distance; and transmitting a request to the peer computing device to establish the P2P network.

16. The computer-implemented method of claim 14, wherein communications over the wireless communication channel are transmitted and received based on at least one of a Wi-Fi connection, a Bluetooth connection, or an NFC connection.

17. The computer-implemented method of claim 14, wherein assessing the network connection strength of each of the plurality of computing devices comprises assessing wireless signal strength, networking bandwidth, latency, wireless connection stability, Internet connection stability, and network transfer speeds of each of the plurality of computing devices.

18. The computer-implemented method of claim 14, wherein assessing the network connection strength further comprises generating a ranked list of the plurality of computing devices within the P2P network ordered by network connection strength.

19. The computer-implemented method of claim 14, wherein designating the gateway device further comprises:

detecting that the gateway device is unavailable;

reassessing the network connection strength of each of the plurality of computing devices; and based on reassessing the network connection strength of each of the plurality of computing devices, designating a replacement gateway device to process the one or more online processing tasks in the processing queue.

20. The computer-implemented method of claim 14, wherein the processing queue further comprises data and metadata required to process each of the one or more one processing tasks.

* * * * *